United States Patent
Zhou et al.

(10) Patent No.: US 10,764,819 B2
(45) Date of Patent: Sep. 1, 2020

(54) NETWORK SEARCH METHOD AND APPARATUS UNDER DOUBLE-CARD MODE, AND COMPUTER STORAGE MEDIUM

(71) Applicant: ONEPLUS TECHNOLOGY (SHENZHEN) CO., LTD., Shenzhen (CN)

(72) Inventors: Hanxin Zhou, Shenzhen (CN); Zhicheng Wang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/301,820

(22) PCT Filed: May 10, 2017

(86) PCT No.: PCT/CN2017/083836
§ 371 (c)(1),
(2) Date: Nov. 15, 2018

(87) PCT Pub. No.: WO2017/198100
PCT Pub. Date: Nov. 23, 2017

(65) Prior Publication Data
US 2019/0166552 A1 May 30, 2019

(30) Foreign Application Priority Data
May 19, 2016 (CN) .......................... 2016 1 0338584

(51) Int. Cl.
*H04W 48/16* (2009.01)
*H04W 88/06* (2009.01)
(Continued)

(52) U.S. Cl.
CPC .......... *H04W 48/16* (2013.01); *H04W 8/183* (2013.01); *H04W 88/06* (2013.01); *H04W 84/042* (2013.01)

(58) Field of Classification Search
None
See application file for complete search history.

(56) References Cited

U.S. PATENT DOCUMENTS

| 8,494,519 B2 | 7/2013 | Shi |
| 8,630,272 B2 | 1/2014 | Park |

(Continued)

FOREIGN PATENT DOCUMENTS

| CN | 101217743 A | 7/2008 |
| CN | 101553055 A | 10/2009 |

(Continued)

OTHER PUBLICATIONS

International Search Report in international application No. PCT/CN2017/083836, dated Jul. 28, 2017.
(Continued)

*Primary Examiner* — Hong S Cho
(74) *Attorney, Agent, or Firm* — Syncoda LLC; Feng Ma

(57) ABSTRACT

A network search method and apparatus under a double-card mode, and a computer storage medium are provided. In the method, a network search instruction about a secondary card is obtained, responding to the network search instruction, whether a primary card uses service data is detected; when it is detected that the primary card uses the service data, a foreground public land mobile network search process is started; when it is detected that the primary card does not use the service data, a background public land mobile network search process is started; and operator network information found in the foreground public land mobile network search process or operator network information found in the back- (Continued)

ground public land mobile network search process is displayed.

15 Claims, 5 Drawing Sheets

(51) Int. Cl.
*H04W 8/18* (2009.01)
*H04W 84/04* (2009.01)
*H04W 24/04* (2009.01)

(56) References Cited

U.S. PATENT DOCUMENTS

| | | | |
|---|---|---|---|
| 8,700,036 B2 | 4/2014 | Shi | |
| 9,049,647 B1 | 6/2015 | Ravuvari et al. | |
| 9,288,813 B2 | 3/2016 | Park | |
| 9,414,408 B2 | 8/2016 | Park et al. | |
| 2008/0108346 A1* | 5/2008 | Umatt | H04W 48/16 455/432.1 |
| 2009/0088154 A1 | 4/2009 | Umatt | |
| 2010/0165959 A1 | 7/2010 | Park | |
| 2010/0279637 A1 | 11/2010 | Umatt | |
| 2012/0021734 A1 | 1/2012 | Shi | |
| 2012/0021804 A1 | 1/2012 | Shi | |
| 2014/0192788 A1 | 7/2014 | Park | |
| 2015/0181506 A1* | 6/2015 | Ravuvari | H04W 8/183 455/434 |
| 2015/0341846 A1* | 11/2015 | Shi | H04W 48/16 455/434 |
| 2016/0044582 A1* | 2/2016 | Pasumarthi | H04W 48/16 455/434 |
| 2016/0135216 A1 | 5/2016 | Park et al. | |

FOREIGN PATENT DOCUMENTS

| | | |
|---|---|---|
| CN | 101977420 A | 2/2011 |
| CN | 101977424 A | 2/2011 |
| CN | 103068009 A | 4/2013 |
| CN | 104105166 A | 10/2014 |
| CN | 104113937 A | 10/2014 |
| CN | 104469893 A | 3/2015 |
| CN | 105430159 A | 3/2016 |
| CN | 105933930 A | 9/2016 |
| CN | 106211280 A | 12/2016 |
| EP | 2428071 A1 | 3/2012 |
| WO | 2009046133 A1 | 4/2009 |

OTHER PUBLICATIONS

English Translation of the Written Opinion of the International Search Authority in international application No. PCT/CN2017/083836, dated Jul. 28, 2017.
Supplementary European Search Report in European application No. 17798663.5, dated Feb. 11, 2019.

* cited by examiner

NETWORK SEARCH METHOD AND APPARATUS UNDER DOUBLE-CARD MODE, AND COMPUTER STORAGE MEDIUM

CROSS-REFERENCE TO RELATED APPLICATIONS

The present application is filed based upon and claims priority to Chinese Patent Application No. 201610338584.2, filed on May 19, 2016, the content of which is hereby incorporated by reference in its entirety.

TECHNICAL FIELD

The present disclosure relates to the technical field of computers, and particularly to a method and device for network search in a double-Subscriber Identity Module (SIM)-card mode and a computer storage medium.

BACKGROUND

At present, for a dual SIM dual standby single active full-netcom mobile phone, a user, when manually searching for a network using an secondary card, is required to enter a setting application and select a network operator option of the secondary card, and then the mobile phone may start a background Public Land Mobile Net (PLMN) search flow to search the network of the operator. After the network of the operator is found successfully, the found network of the operator is displayed.

However, in the conventional method, when searching for the network of the operator using the secondary card, if a master card is using service data, for example, a browser is downloading a file, the background PLMN search flow may fail because the priority of the background PLMN search is relatively low. The terminal may display that "no network is found" to the user, the user is required to enter a manual network search application again to search the network again, and the terminal further checks whether the network search at last time fails or not, if the network search at last time fails, the foreground PLMN search flow is performed and, if the network search at last time succeeds, the background PLMN search flow is performed. It is apparent that, in the conventional method, the user may find the network by executing a manual network search operation for many times and the success rate of the network search is low.

SUMMARY

In view of this, it is necessary to provide a method and device for network search in a double-SIM-card mode and a computer storage medium, which may increase the success rate of the network search.

Embodiments of the present disclosure provide a method for network search in a double-SIM-card mode, which may include the following operations.

A network search instruction for a secondary card is acquired and, responsive to the network search instruction, whether a master card is using service data is detected.

Responsive to detecting that the master card is using the service data, foreground PLMN search is started for network search.

Responsive to detecting that the master card is not using the service data, background PLMN search is started for network search.

Operator network information found by the foreground PLMN search flow or operator network information found by the background PLMN search flow is displayed.

In one embodiment, the operation that whether the master card is using the service data is detected may include the following operation.

Whether a network Internet Protocol (IP) address for data access is stored in a first preset object configured to store data access dialing information is detected, when the network IP address for the data access is stored in the first preset object, it is determined that the master card is using the service data and, when the network IP address for the data access is not stored in the first preset object, it is determined that the master card is not using the service data.

In one embodiment, the first preset object may be a DataCallResponse object.

In one embodiment, the operation that whether the master card is using the service data is detected may include the following operations.

Whether a network data connection state in a second preset object configured to store network data connection state information is a connected state is detected.

When the network data connection state in the second preset object is the connected state, it is determined that the master card is using the service data and, when the network data connection state in the second preset object is a disconnected state, it is determined that the master card is not using the service data.

In one embodiment, the method may further include that: when the background PLMN search flow fails, the foreground PLMN search is started for network search.

The embodiments of the present disclosure provide a device for network search in a SIM mode, which may include a master card data detection module, a search control module and a display module.

The master card data detection module may be configured to acquire a network search instruction for a secondary card and, responsive to the network search instruction, detect whether a master card is using service data.

The search control module may be configured to, responsive to detecting, by the master card data detection module, that the master card is using the service data, start foreground PLMN search and, responsive to detecting, by the master card data detection module, that the master card is not using the service data, start background PLMN search.

The display module may be configured to display operator network information found by a foreground PLMN search flow or operator network information found by a background PLMN search flow.

In one embodiment, the master card data detection module may further be configured to detect whether a network IP address for data access is stored in a first preset object configured to store data access dialing information, when the network IP address for the data access is stored in the first preset object, determine that the master card is using the service data and, when the network IP address for the data access is not stored in the first preset object, determine that the master card is not using the service data.

In one embodiment, the first preset object may be a DataCallResponse object.

In one embodiment, the master card data detection module may further be configured to detect whether a network data connection state in a second preset object configured to store network data connection state information is a connected state, when the network data connection state in the second preset object is the connected state, determine that the master card is using the service data and, when the network data connection state in the second preset object is a disconnected state, determine that the master card is not using the service data.

In one embodiment, the search control module may further be configured to, when the background PLMN search flow fails in network search, start foreground PLMN search for network search.

When executing processing, the master card data detection module, the search control module and the display module may be implemented by adopting a Central Processing Unit (CPU), a Digital Signal Processor (DSP) or a Field-Programmable Gate Array (FPGA).

The embodiments of the present disclosure provide a computer storage medium having stored therein computer-executable instructions for executing the abovementioned method for network search in the double-SIM-card mode.

According to the solution of the embodiments of the present disclosure for network search in the dual-SIM-card mode, the network search instruction for a secondary card is acquired and, responsive to the network search instruction, whether the master card is using the service data is detected; responsive to detecting that the master card is using the service data, foreground PLMN search is started for network search; responsive to detecting that the master card is not using the service data, background PLMN search is started for network search; and the operator network information found by the foreground PLMN search flow or the operator network information found by the background PLMN search flow is displayed. A search failure caused by the fact that the master card is using the data when network search for the additional card is performed is avoided and the success rate of the network search is increased.

DETAILED DESCRIPTION

In order to make the purposes, technical solutions and advantages of the present disclosure clearer, specific implementation modes of a method and device of the present disclosure for network search in a dual SIM mode will further be described below with embodiments in combination with the drawings in detail. It is to be understood that specific embodiments described herein are only adopted to explain the present disclosure and not intended to limit the present disclosure.

Figure 1:
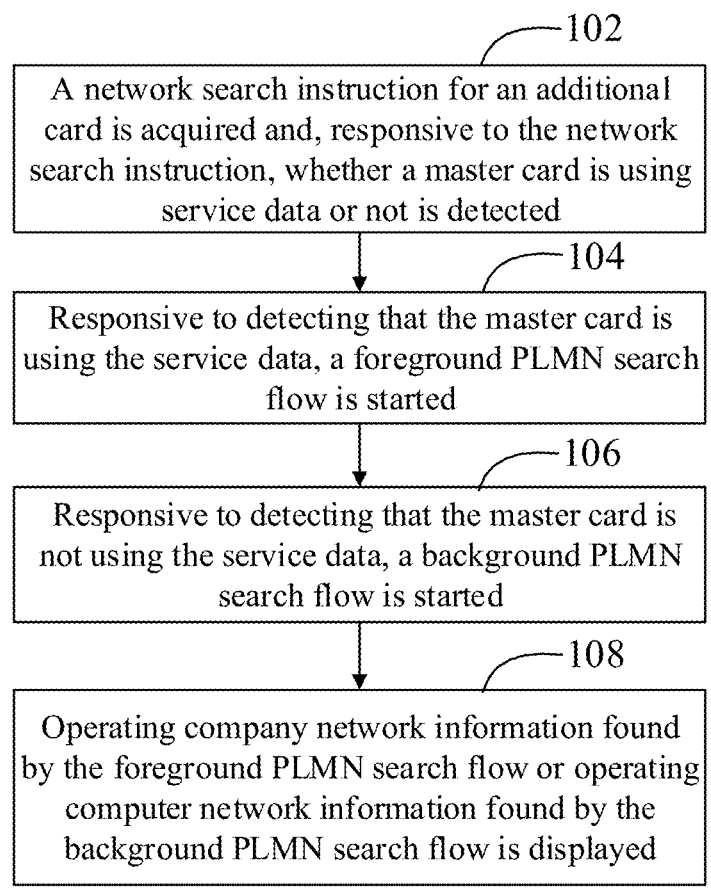
FIG. 1 is a flowchart of a method for network search in a dual-SIM-card mode according to an embodiment.

Referring to FIG. 1, an embodiment provides a method for network search in a dual-SIM-card mode. Descriptions will be made now by taking that the method is applied to a terminal as an example. The method includes the following operations.

In 102, a network search instruction for a secondary card is acquired and, responsive to the network search instruction, whether a master card is using service data is detected.

In the embodiment, a user starts a search operation for an operator network of the secondary card through a display interface of the terminal. Specifically, the user may select a network operator option for the secondary card on the display interface through an operation of clicking, pressing or the like (for example, the user clicks a button or menu "select the operator") to start the search operation for the operator network of the secondary card. The terminal acquires the generated network search instruction for the secondary card.

In an embodiment of the present disclosure, the terminal may also detect whether the master card is using the service data responsive to the network search instruction.

The service data refers to data used when the terminal performs data interaction by accessing a network through the master card. It can be understood that use of a network by the terminal through the master card for some service operations means that the master card is using the service data. For example, data used when the terminal uses the network through the master card to connect a browser application to the network to download a file is service data and data used when the terminal uses the network through the master card to connect a voice call application to the network to make a call is also service data.

In 104, responsive to detecting that the master card is using the service data, a foreground PLMN search flow is started.

In 106, responsive to detecting that the master card is not using the service data, a background PLMN search flow is started.

In the embodiment, the terminal performs search control processing according to a detection result about whether the master card is using the service data. Specifically, responsive to detecting that the master card is using the service data, the foreground PLMN search flow is started and, responsive to detecting that the master card is not using the service data, the background PLMN search flow is started.

In addition, the user may obtain operator network information found for the secondary card by executing a network search operation for the secondary card only once. Therefore, operation cost of the user is reduced.

In an embodiment of the present disclosure, the terminal acquires a preset mode and determines a search band and frequency point to search an operator network according to the started mobile network search flow (the foreground PLMN search flow or the background PLMN search flow) and the acquired preset mode. The mode refers to a network mode. Different network modes correspond to different bands.

The mode refers to multiple network modes such as Global System for Mobile Communication (GSM), Code Division Multiple Access (CDMA), Wideband Code Division Multiple Access (WCDMA), Time Division Long Term Evolution (TD-LTE) and Time Division-Synchronous Code Division Multiple Access (TD-SCDMA). Types of the modes will not be listed one by one herein. It can be understood that a type of the preset mode is not limited in the embodiment of the present disclosure and any mode supported by the secondary card may be set as the preset mode. That is, the preset mode may include at least one type of the mode.

In an embodiment of the present disclosure, foreground PLMN search refers to full-band search, that is, network search is performed on all bands under the determined mode.

Background PLMN search refers to partial-band search, that is, network search is performed on a preset band under the determined mode. It is to be noted that the preset band mentioned herein refers to a band capable of meeting a universal network search requirement, that is, a network meeting the universal requirement may be found by search on the preset band.

It can be understood that, when foreground PLMN search is started for search, use of the network by the master card may be suspended and the full-band network search may be performed. After foreground PLMN search is completed, the master card may use the service data through the network. When the master card is using the service data, background PLMN search may not succeed. This is because the priority of the background PLMN search is lower than the priority for use of the service data by the master card.

In 108, operator network information found by the foreground PLMN search flow or operator network information found by the background PLMN search flow is displayed.

In an embodiment of the present disclosure, the terminal acquires the operator network information found according to the started mobile network search flow. Specifically, when the started mobile network search flow is the foreground PLMN search flow, the operator network information found by the foreground PLMN search flow is acquired. When the started mobile network search flow is the background PLMN search flow, the operator network information found by the background PLMN search flow is acquired.

Figure 2:
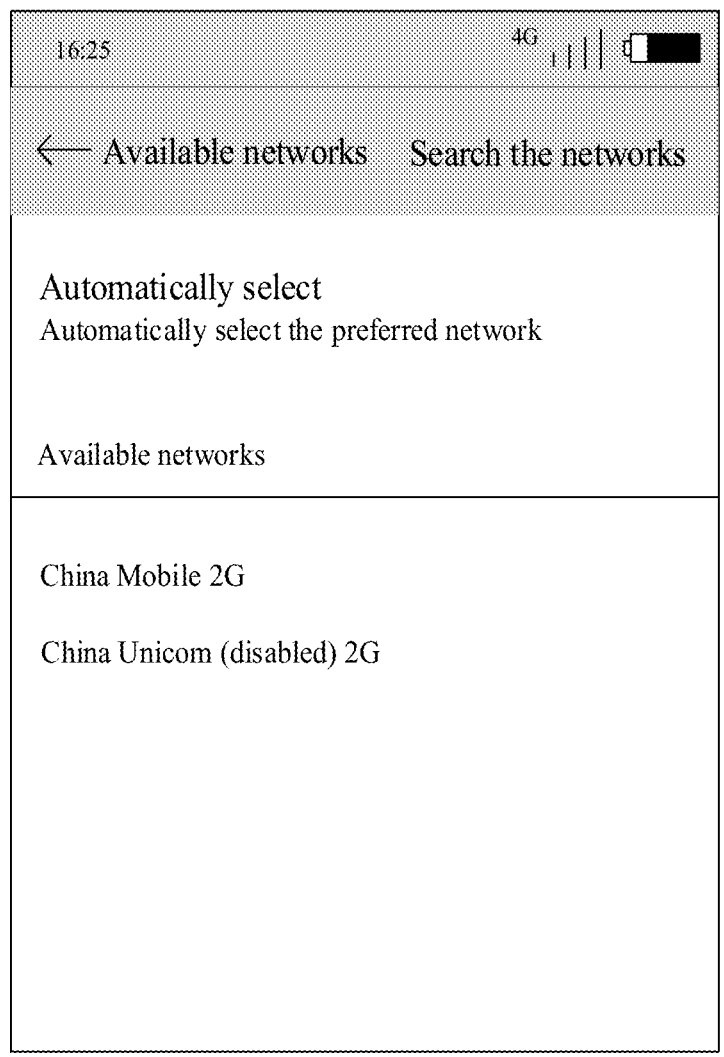
FIG. 2 is a schematic diagram of a display interface for found operator network information according to an embodiment.

In an embodiment of the present disclosure, the terminal displays the found operator network information. As shown in FIG. 2, FIG. 2 is a schematic diagram of a display interface for found operator network information according to an embodiment. "China Mobile 2nd-Generation (2G)" and "Chine Unicom (disabled) 2G" in the display interface are the found operator network information.

In the embodiment, when the network search instruction for the secondary card is acquired, the control for the mobile network search flow is performed by detecting whether the master card is using the service data; responsive to detecting that the master card is using the service data, the foreground PLMN search flow is started; and responsive to detecting that the master card is not using the service data, the background PLMN search flow is started and the operator network information found according to the started mobile network search flow is displayed. A search failure caused by the fact that the master card is using the data when network search for the secondary card is performed is avoided and the success rate of the network search is increased.

In addition, the user may obtain the operator network information found for the secondary card by executing the network search operation for the secondary card only once. Therefore, the operation cost of the user is reduced.

Figure 3:
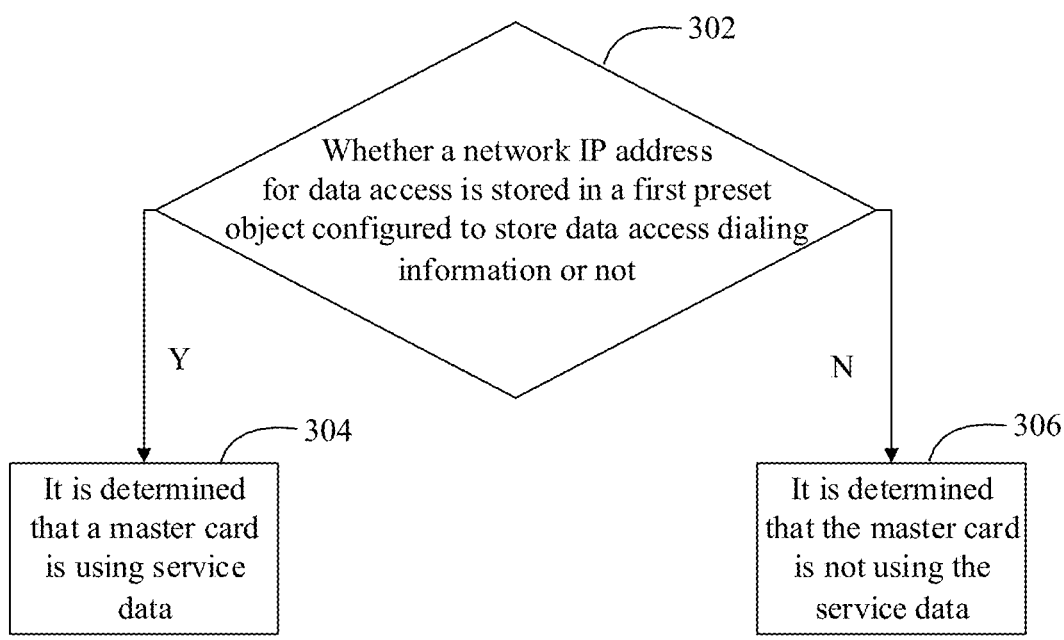
FIG. 3 is a flowchart of a method for detecting whether a master card is using service data according to an embodiment.

As shown in FIG. 3, in an embodiment, the operation that whether the master card is using the service data is detected (called a detection operation for whether the master card is using the service data for short) includes the following operations.

In 302, whether a network IP address for data access is stored in a first preset object configured to store data access dialing information is detected. If the network IP address for the data access is stored in the first preset object, 304 is executed and, if the network IP address for the data access is not stored in the first preset object, 306 is executed.

In 304, it is determined that the master card is using the service data.

In 306, it is determined that the master card is not using the service data.

In the embodiment, the first preset object is provided in a framework layer of the terminal. The object refers to a structure variable. The data access dialing information may be stored in the first preset object. It can be understood that the terminal, when requesting to use the network through the master card, may initiate a data access dialing request, acquire the data access dialing information returned according to the data access dialing request and further store the acquired data access dialing information in the first preset object. The data access dialing information includes the network IP address allocated for the data access.

It is to be noted that it is only indicated herein that the first preset object has a function of storing the data access dialing information and other functions of the first preset object are not limited.

In an embodiment of the present disclosure, the first preset object is an object DataCallResponse. For example, the object DataCallResponse includes the following information: 02-05 09:44:13.706 1680 1921DRILJ:[UNSL]<UNSOL_DATA_CALL_LIST_CHANGED [DataCallResponse: {version=10 status=0 retry=−1 cid=0 active=2 type=IPV4V6 ifname=rmnet( ) mtu=1300 addresses1100.107.58.152/281 dnses1202.96.128.86, 202.96.134.1331 gateways=[100.107.58.153] pcscf=[ ]}] [SUB1]. Network IP address information is 100.107.58.152/28.

It can be understood that the data access dialing information may also be stored in another specified preset object.

In an embodiment of the present disclosure, the terminal, after acquiring the network search instruction for the secondary card and responsive to the network search instruction, finds the first preset object and detects whether the network IP address for the data access is stored in the first preset object. Responsive to detecting that the network IP address for the data access is stored in the first preset object (that is, a network IP address value in the first preset object is not null), it is determined that the master card is using the service data. Responsive to detecting that the network IP address for the data access is not stored in the first preset object (that is, the network IP address value in the first preset object is null), it is determined that the master card is not using the service data.

In the implementation, whether the master card is using the service data is determined according to whether the network IP address is stored in the first preset object and, according to a determination result, different search control is performed and the corresponding mobile network search flow is started. The search failure caused by the fact that the master card is using the data when network search for the secondary card is performed may be avoided and the success rate of the network search is increased. Moreover, the operation cost of the user is reduced.

In an embodiment, the operation that whether the master card is using the service data is detected includes that: whether a network data connection state in a second preset object configured to store network data connection state information is a connected state is detected, when the network data connection state in the second preset object is a connected state, it is determined that the master card is using the service data and, when the network data connection state in the second preset object is a disconnected state, it is determined that the master card is not using the service data.

In the embodiment, the second preset object is provided in the framework layer of the terminal. The network data connection state information may be stored in the second preset object. It can be understood that the terminal, when using the network through the master card, may store the network data connection state information in the second preset object.

It is to be noted that it is only indicated herein that the second preset object has a function of storing the network data connection state information and other functions of the second preset object are not limited. Furthermore, the second preset object is an OverAll_state object. It can be understood that the network data connection state information may also be stored in another specified preset object.

The terminal, after acquiring the network search instruction for the secondary card and responsive to the network search instruction, finds the second preset object and detects whether the network data connection state in the second preset object is the connected state.

When the network data connection state in the second preset object is the connected state, it is determined that the master card is using the service data and, when the network data connection state in the second preset object is the disconnected state, it is determined that the master card is not using the service data.

It can be understood that the condition that the network data connection state information in the second preset object is null (that is, no data related to the network data connection state exists in the second preset object) also belongs to the condition that the network data connection state in the second preset object is in the disconnected state.

In the embodiment, whether the master card is using the service data is determined through the network data connection state, so that the condition that the network connection state is the disconnected state but the network IP address is stored in the first preset object may be prevented from being determined to be the condition that the master card is using the service data, the foreground PLMN search flow is avoided to be started and, instead, the background PLMN search flow capable of saving more search resources and achieving a higher search speed is started. The determination result about whether the master card is using the service data is more accurate, so that the search resources are saved and the search speed is increased.

Figure 4:
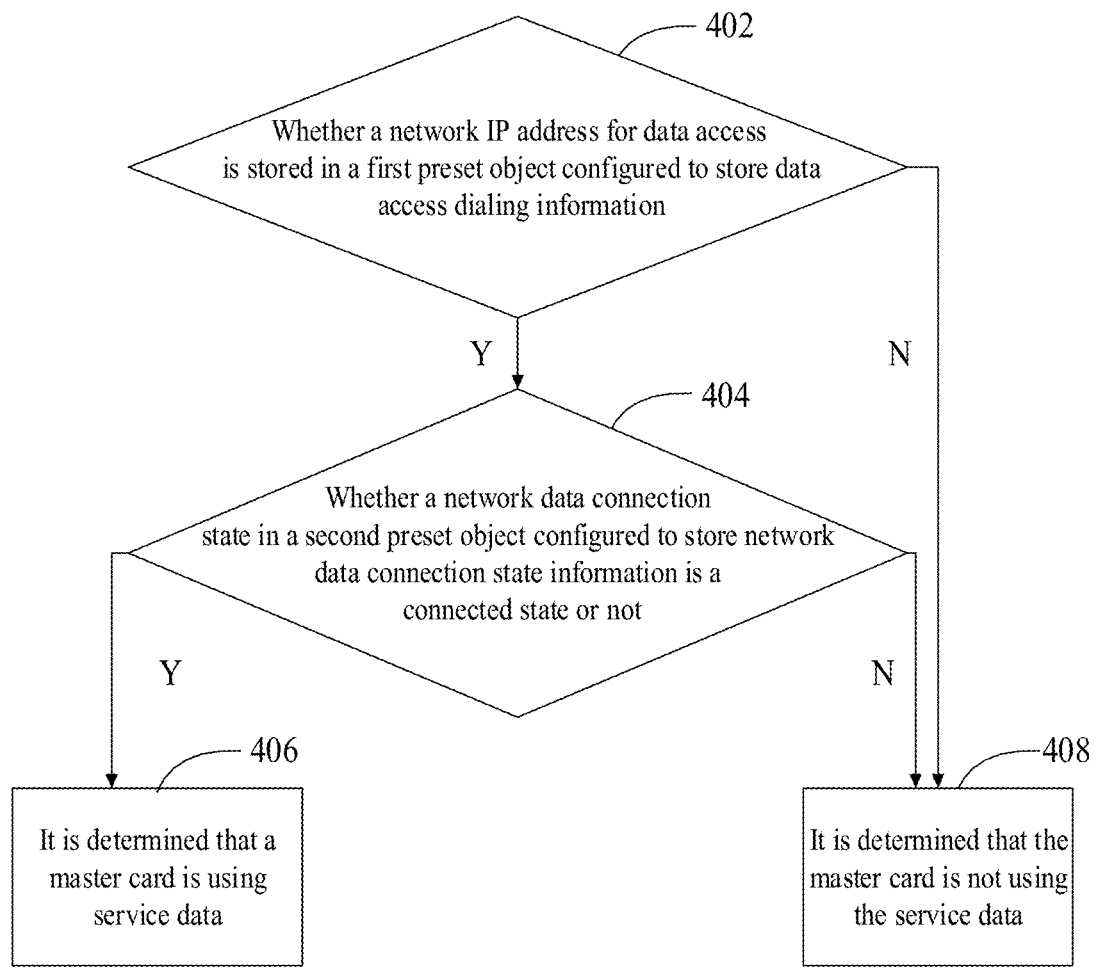
FIG. 4 is a flowchart of a method for detecting whether a master card is using service data according to another embodiment.

As shown in FIG. 4, in an embodiment, the operation that whether the master card is using the service data is detected (called the detection operation for whether the master card is using the service data or not for short) includes the following operations.

In 402, whether the network IP address for data access is stored in the first preset object configured to store the data access dialing information or not is detected. If YES, 404 is executed and, if NO, 408 is executed.

In 404, whether the network data connection state in the second preset object configured to store the network data connection state information is a connected state is detected. If YES, 406 is executed and, if NO, 408 is executed.

In 406, it is determined that the master card is using the service data.

In 408, it is determined that the master card is not using the service data.

In the embodiment, responsive to detecting that the network IP address is stored in the first preset object, whether the network connection state in the second preset object is the connected state is further detected. When the network connection state in the second preset object is the connected state, it is determined that the master card is using the service data. By multilayer and more detailed detection and judgment, the determination result about whether the master card is using the service data is more accurate, so that the search resources are saved and the search speed is increased.

In an embodiment, the method further includes that: when the background PLMN search flow fails, the foreground PLMN search flow is started.

In the embodiment, responsive to detecting that the master card is not using the service data, the terminal starts the background PLMN search flow for network search. When the background PLMN search flow fails in network search, the foreground PLMN search flow is started for network search.

In an embodiment of the present disclosure, it can be understood that the condition that the background PLMN search flow fails may include that the background PLMN search flow is failed to be started and may also include a network search failure caused by the fact that no related network information is found during network search through the successfully started background PLMN search flow.

In the embodiment, when failing in network search, the background PLMN search flow is directly switched into the foreground PLMN search flow for network search to implement connection and switching of the network search flows and increase the network search success rate. In addition, no search failure prompt is required to be returned, so that an operation of initiating a network search request again by the user is avoided and the operation cost of the user is reduced.

Figure 5:
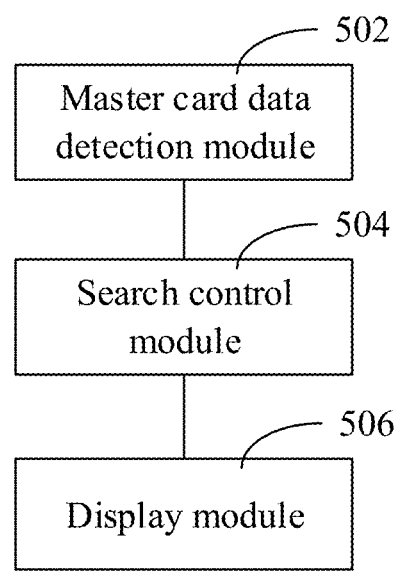
FIG. 5 is a structure diagram of a device for network search in a dual-SIM-card mode according to an embodiment.

As shown in FIG. 5, an embodiment provides a device for network search in a dual-SIM-card mode. The device includes a master card data detection module 502, a search control module 504 and a display module 506.

The master card data detection module 502 is configured to acquire a network search instruction for a secondary card and, responsive to the network search instruction, detect whether a master card is using service data.

The search control module 504 is configured to, responsive to detecting, by the master card data detection module 502, that the master card is using the service data, start a foreground PLMN search flow and, responsive to detecting, by the master card data detection module 502, that the master card is not using the service data, start a background PLMN search flow.

The display module 506 is configured to display operator network information found by the foreground PLMN search flow or operator network information found by the background PLMN search flow.

In an embodiment, the master card data detection module 502 is further configured to detect whether a network IP address for data access is stored in a first preset object configured to store data access dialing information, if YES, determine that the master card is using the service data and, if NO, determine that the master card is not using the service data.

In an embodiment, the first preset object is a DataCall-Response object.

In an embodiment, the master card data detection module 502 is further configured to detect whether a network data connection state in a second preset object configured to store network data connection state information is a connected state, when the network data connection state in the second preset object is the connected state, determine that the master card is using the service data and, when the network data connection state in the second preset object is a disconnected state, determine that the master card is not using the service data.

In an embodiment, the search control module 504 is further configured to, when the background PLMN search flow fails in network search, start the foreground PLMN search flow.

An embodiment of the present disclosure provides a computer storage medium, in which a computer-executable instruction is stored, the computer-executable instruction being configured to execute the abovementioned method for network search in the dual-SIM-card mode.

Those of ordinary skill in the art should understand that all or part of the flows in the method of the abovementioned embodiment may be completed through related hardware instructed by a computer program, the program may be stored in a computer-readable storage medium, and when the program is executed, the flows of each method embodiment may be included. The storage medium may be a magnetic disk, an optical disk, a Read-Only Memory (ROM), a Random Access Memory (RAM) or the like.

Each technical feature of the above embodiments may be freely combined. For brief description, not all possible combinations of each technical feature in the abovementioned embodiments are described, but all the combinations of these technical features shall fall within the scope recorded in the description without conflicts.

The abovementioned embodiments only express some implementation modes of the present disclosure and are specifically described in detail and not thus understood as limits to the patent scope of the present disclosure. It is to be pointed out that those of ordinary skill in the art may further make a plurality of transformations and improvements without departing from the concept of the present disclosure and all of these fall within the scope of protection of the present disclosure. Therefore, the scope of patent protection of the present disclosure should be subject to the appended claims.

INDUSTRIAL APPLICABILITY

According to the embodiments of the present disclosure, the network search instruction for the secondary card is acquired and, responsive to the network search instruction, whether the master card is using the service data is detected; responsive to detecting that the master card is using the service data, the foreground PLMN search flow is started; responsive to detecting that the master card is not using the service data, the background PLMN search flow is started; and the operator network information found by the foreground PLMN search flow or the operator network information found by the background PLMN search flow is displayed. The search failure caused by the fact that the master card is using the data when network search for the secondary card is performed is avoided and the network search success rate is increased.

The invention claimed is:

1. A method for network search in a dual-Subscriber Identity Module (SIM)-card mode, comprising:
    acquiring a network search instruction for a secondary card and, responsive to the network search instruction, detecting whether a master card is using service data;
    responsive to detecting that the master card is using the service data, starting foreground Public Land Mobile Net (PLMN) search;
    responsive to detecting that the master card is not using the service data, starting background PLMN search; and
    displaying operator network information found by the foreground PLMN search or displaying operator network information found by the background PLMN search,
    wherein the detecting whether the master card is using the service data comprises:
        detecting whether a network Internet Protocol (IP) address for data access is stored in a first preset object configured to store data access dialing information, when the network IP address for the data access is stored in the first preset object, determining that the master card is using the service data, and when the network IP address for the data access is not stored in the first preset object, determining that the master card is not using the service data.

2. The method of claim 1, wherein the first preset object is a DataCallResponse object.

3. The method of claim 1, wherein detecting whether the master card is using the service data further comprises:
    detecting whether a network data connection state in a second preset object configured to store network data connection state information is a connected state; and
    when the network data connection state in the second preset object is the connected state, determining that the master card is using the service data and, when the network data connection state in the second preset object is a disconnected state, determining that the master card is not using the service data.

4. The method of claim 1, further comprising: when the background PLMN search fails, starting the foreground PLMN search.

5. The method of claim 1, wherein the foreground PLMN search comprises full-band search and the background PLMN search comprises partial-band search.

6. A device for network search in a dual-Subscriber Identity Module (SIM)-card mode, comprising a processor and a memory for storing a set of instructions executable by the processor, wherein when the instructions are executed by the processor, the processor is configured to:
    acquire a network search instruction for a secondary card and, responsive to the network search instruction, detect whether a master card is using service data;
    responsive to detecting that the master card is using the service data, start foreground Public Land Mobile Net (PLMN) search and, responsive to detecting that the master card is not using the service data, start background PLMN search; and
    display operator network information found by the foreground PLMN search or display operator network information found by the background PLMN search,
    wherein the processor is further configured to: detect whether a network Internet Protocol (IP) address for data access is stored in a first preset object configured to store data access dialing information, when the network IP address for the data access is stored in the first preset object, determine that the master card is using the service data and, when the network IP address for the data access is not stored in the first preset object, determine that the master card is not using the service data.

7. The device of claim 6, wherein the first preset object is a DataCallResponse object.

8. The device of claim 6, wherein the processor is further configured to: detect whether a network data connection state in a second preset object configured to store network data connection state information is a connected state, when the network data connection state in the second preset object is a connected state, determine that the master card is using the service data and, when the network data connection state in the second preset object is a disconnected state, determine that the master card is not using the service data.

9. The device of claim 6, wherein the processor is further configured to, when the background PLMN search fails, start the foreground PLMN search.

10. The device of claim 6, wherein the foreground PLMN search comprises full-band search and the background PLMN search comprises partial-band search.

11. A non-transitory computer storage medium having stored therein computer-executable instructions for executing a method for network search in a dual-Subscriber Identity Module (SIM)-card mode, wherein the method comprises:

acquiring a network search instruction for a secondary card and, responsive to the network search instruction, detecting whether a master card is using service data;

responsive to detecting that the master card is using the service data, starting foreground Public Land Mobile Net (PLMN) search;

responsive to detecting that the master card is not using the service data, starting background PLMN search; and displaying operator network information found by the foreground PLMN search or displaying operator network information found by the background PLMN search, wherein the detecting whether the master card is using the service data comprises:

detecting whether a network Internet Protocol (IP) address for data access is stored in a first preset object configured to store data access dialing information, when the network IP address for the data access is stored in the first preset object, determining that the master card is using the service data, and when the network IP address for the data access is not stored in the first preset object, determining that the master card is not using the service data.

12. The non-transitory computer storage medium of claim 11, wherein the first preset object is a DataCallResponse object.

13. The non-transitory computer storage medium of claim 11, wherein the step of detecting whether the master card is using the service data further comprises:

detecting whether a network data connection state in a second preset object configured to store network data connection state information is a connected state; and when the network data connection state in the second preset object is the connected state, determining that the master card is using the service data and, when the network data connection state in the second preset object is a disconnected state, determining that the master card is not using the service data.

14. The non-transitory computer storage medium of claim 11, wherein the method further comprises:

when the background PLMN search fails, starting the foreground PLMN search.

15. The non-transitory computer storage medium of claim 11, wherein the foreground PLMN search comprises full-band search and the background PLMN search comprises partial-band search.

* * * * *